(12) United States Patent
Miyaguchi

(10) Patent No.: US 12,243,685 B2
(45) Date of Patent: Mar. 4, 2025

(54) ELECTROCHEMICAL DEVICE

(71) Applicant: Panasonic Intellectual Property Management Co., Ltd., Osaka (JP)

(72) Inventor: Nao Miyaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 238 days.

(21) Appl. No.: 17/998,655

(22) PCT Filed: May 18, 2021

(86) PCT No.: PCT/JP2021/018829
§ 371 (c)(1),
(2) Date: Nov. 12, 2022

(87) PCT Pub. No.: WO2021/241334
PCT Pub. Date: Dec. 2, 2021

(65) Prior Publication Data
US 2023/0197359 A1    Jun. 22, 2023

(30) Foreign Application Priority Data
May 29, 2020 (JP) .................. 2020-094833

(51) Int. Cl.
*H01G 11/24* (2013.01)
*H01G 11/42* (2013.01)
*H01G 11/58* (2013.01)

(52) U.S. Cl.
CPC ............ *H01G 11/24* (2013.01); *H01G 11/42* (2013.01); *H01G 11/58* (2013.01)

(58) Field of Classification Search
CPC ......... H01G 11/24; H01G 11/42; H01G 11/58
See application file for complete search history.

(56) References Cited

U.S. PATENT DOCUMENTS

| | | | | |
|---|---|---|---|---|
| 2003/0161781 A1* | 8/2003 | Cabasso | ............... | C04B 35/532 29/25.03 |
| 2010/0255377 A1* | 10/2010 | Tsubata | .............. | B01J 20/28092 429/231.8 |

(Continued)

FOREIGN PATENT DOCUMENTS

| | | |
|---|---|---|
| JP | 2011-121785 | 6/2011 |
| JP | 2011121785 A * | 6/2011 |

(Continued)

OTHER PUBLICATIONS

International Search Report of PCT application No. PCT/JP2021/018829 dated Aug. 17, 2021.

*Primary Examiner* — Michael P McFadden
(74) *Attorney, Agent, or Firm* — Rimon P.C.

(57) ABSTRACT

An electrochemical device includes a pair of electrodes and an electrolytic solution. At least one of the pair of electrodes contains porous carbon particles. In a pore distribution of the porous carbon particles, an integrated volume B is more than or equal to 0.15 cm$^3$/g and an integrated volume C is less than or equal to 0.25 cm$^3$/g. The integrated volume B is an integrated volume of pores each having a pore diameter of more than or equal to 20 Å and less than or equal to 60 Å. The integrated volume C is an integrated volume of pores each having a pore diameter of more than 60 Å and less than or equal to 500 Å.

8 Claims, 2 Drawing Sheets

(56) References Cited

U.S. PATENT DOCUMENTS

| | | | |
|---|---|---|---|
| 2010/0276631 A1* | 11/2010 | Mabuchi | B01J 20/20 |
| | | | 252/182.1 |
| 2013/0202962 A1* | 8/2013 | Sakai | H01G 11/48 |
| | | | 521/50 |
| 2015/0116907 A1 | 4/2015 | Ito | |

FOREIGN PATENT DOCUMENTS

| | | | |
|---|---|---|---|
| JP | 2014-072497 | | 4/2014 |
| JP | 2014072497 A | * | 4/2014 |
| JP | 6357639 B | | 7/2018 |

* cited by examiner

ELECTROCHEMICAL DEVICE

TECHNICAL FIELD

The present invention relates to an electrochemical device including an electrode containing porous carbon particles.

BACKGROUND

An electrochemical device includes a pair of electrodes and an electrolytic solution, and at least one of the pair of electrodes contains an active material capable of adsorbing and desorbing ions. An electric double layer capacitor, which is an example of an electrochemical device, has a longer life than a secondary battery, can be rapidly charged, has excellent output characteristics, and is widely used as a backup power supply or the like.

As the active material of the electrochemical device, for example, porous carbon particles (activated carbon) obtained by subjecting a raw material such as coconut shell to a carbonization treatment and an activation treatment are used. Various studies have been conducted on activated carbon. For example, Japanese Patent No. 6,357,639 proposes that a total surface functional group density D in the average cross section of pores of activated carbon is set to a specific range.

SUMMARY

The capacitance of the electrochemical device may be reduced depending on the pore distribution of the porous carbon particles, and the float characteristics of the electrochemical device may be easily deteriorated. Studies on the relationship between the pore distribution of porous carbon particles and the performance of electrochemical device are still insufficient.

In view of the above, one aspect of the present invention relates to an electrochemical device including a pair of electrodes and an electrolytic solution. At least one of the pair of electrodes contains porous carbon particles. In a pore distribution of the porous carbon particles, an integrated volume B is more than or equal to 0.15 cm$^3$/g, and an integrated volume C is less than or equal to 0.25 cm$^3$/g. The integrated volume B is an integrated volume of pores each having a pore diameter of more than or equal to 20 Å and less than or equal to 60 Å. The integrated volume C is an integrated volume of pores each having a pore diameter of more than 60 Å and less than or equal to 500 Å.

According to the present invention, it is possible to suppress deterioration of float characteristics of the electrochemical device while the capacitance of the electrochemical device is increased.

DESCRIPTION OF EMBODIMENT

Figure 1:
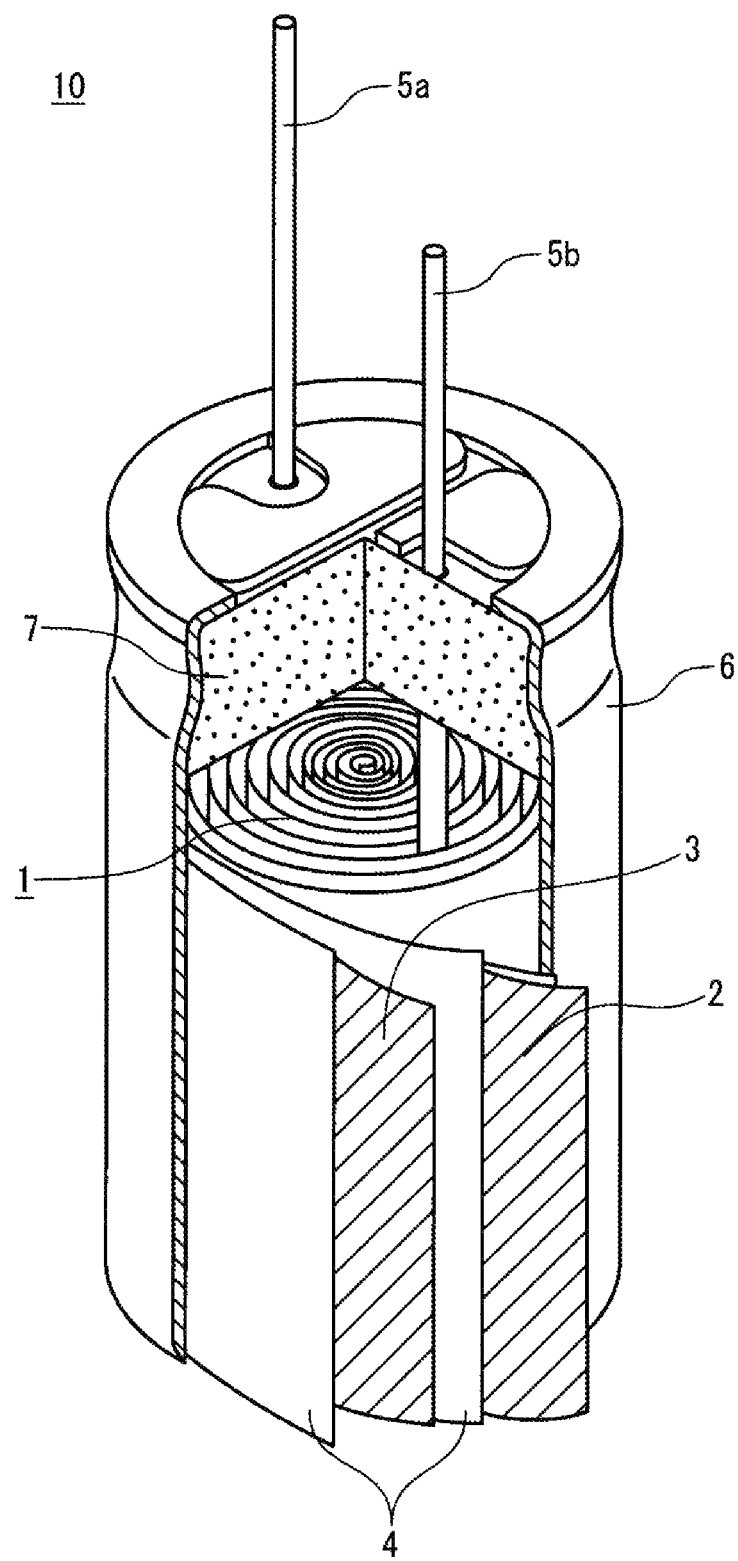
FIG. 1 is a partially cutout perspective view illustrating an electrochemical device according to an exemplary embodiment of the present invention.

An electrochemical device according to an exemplary embodiment of the present invention includes a pair of electrodes and an electrolytic solution. At least one of the pair of electrodes contains porous carbon particles. When ions are adsorbed to the porous carbon particles in the electrolytic solution, an electric double layer is formed to exhibit capacitance. When ions are desorbed from the porous carbon particles, a non-faradaic current flows. The electrode included in the electrochemical device according to the present exemplary embodiment utilizes such a phenomenon. In the pore distribution of the porous carbon particles, the integrated volume B of pores each having a pore diameter of more than or equal to 20 Å and less than or equal to 60 Å (hereinafter, also referred to as mesopores) is more than or equal to 0.15 cm$^3$/g. And the integrated volume C of pores having a pore diameter of more than 60 Å and less than or equal to 500 Å (hereinafter, also referred to as macropores) is less than or equal to 0.25 cm$^3$/g.

When the integrated volume B is more than or equal to 0.15 cm$^3$/g, an electrochemical device having a large capacitance (initial capacitance) and excellent float characteristics can be obtained even in a low-temperature environment. The float characteristics are an index of the degree of deterioration of the electrochemical device when float charge maintaining a constant voltage is performed with an external DC power supply. It can be said that the float characteristics are more favorable as a decrease in capacitance is smaller and an increase in internal resistance is suppressed during float charge. However, when the integrated volume C is larger than 0.25 cm$^3$/g, the proportion of the macropores increases, the electrode density decreases, and the capacitance may decrease.

The mesopores mainly contribute to the mobility of ions in the electrolytic solution in the pores, and mainly affect float characteristics and internal resistance. The mesopores also contribute to the specific surface area of the porous carbon particles and affect the capacitance (initial capacitance). When the pore diameter is more than or equal to 20 Å, ions in the electrolytic solution are easily diffused in the pores, and the pores are not easily clogged. In the pores having a pore diameter of more than or equal to 20 Å, favorable movement of ions is secured even at a low temperature. When the pore diameter is less than or equal to 60 Å, the specific surface area is easily increased, and a large initial capacitance is easily obtained.

The integrated volume B may be, for example, from 0.15 cm$^3$/g to 0.35 m$^3$/g, inclusive, or from 0.25 cm$^3$/g to 0.30 cm$^3$/g, inclusive. From the viewpoint of further increasing the capacitance, the integrated volume C may be less than or equal to 0.15 cm$^3$/g.

In the pore distribution of the porous carbon particles, the ratio B/A of the integrated volume B to an integrated volume A of pores each having a pore diameter of more than or equal to 10 Å and less than 20 Å (hereinafter, also referred to as micropores) may be more than or equal to 0.5, from 0.5 to 0.65, inclusive, or from 0.5 to 0.6, inclusive. When the ratio B/A is in the above range, many mesopores are secured together with the micropores, and the float characteristics are further improved while a large capacitance is obtained. The micropores mainly contribute to the specific surface area, and are likely to mainly affect the capacitance (particularly, initial capacitance).

In the pore distribution of the porous carbon particles, the proportion of total of the integrated volumes A and B in the total pore volume (total of volumes of all pores in a range of from 10 Å to 3,000 Å, inclusive) ranges preferably, for example, from 60% to 85%, inclusive. In this case, many micropores and mesopores are distributed, and a large capacitance and excellent float characteristics are easily obtained.

The integrated volumes A to C are determined by disassembling an unused or initial electrochemical device in a completely discharged state, taking out an electrode, peeling off an active layer from a current collector, pulverizing the active layer, heating and drying the pulverized product at 160° C. to obtain a sample (particle group), and measuring the pore distribution of the sample.

The pore distribution is measured by a gas adsorption method using nitrogen gas. As the measuring apparatus, for example, an automatic specific surface area/pore distribution measuring apparatus "TriStar II 3020" manufactured by Shimadzu Corporation is used. In order to remove impurities, the sample is subjected to a pretreatment of heating and evacuation (for example, less than or equal to 50 mTorr at 250° C.) and measured. A Barrett-Joyner-Halenda (BJH) method is used to analyze the pore distribution, and the Harkins & Jura equation is used in the BJH method. Using the integrated pore volume distribution obtained by the BJH method, the total volumes ($cm^3$) of the micropores, mesopores, and macropores per 1 g of the sample are respectively determined as the integrated volumes A to C.

The sample may contain a binding agent and a conductive agent in addition to the porous carbon particles, but the binding agent and the like are contained in a small amount, and the influence on the pore distribution of the porous carbon particles is small. The shape of the integrated pore volume distribution curve is almost the same as that in the case of only porous carbon particles, and the integrated pore volume distribution curve is slightly shifted downward (the integrated volume is slightly reduced) as compared with the case of only porous carbon particles.

In the log differential pore volume distribution of the porous carbon particles, it is preferable that a log differential pore volume $V_{20}$ (hereinafter, also simply referred to as $V_{20}$) at a pore diameter of 20 Å be more than or equal to 0.5 $cm^3/g·Å$, and a log differential pore volume $V_{60}$ (hereinafter, also simply referred to as $V_{60}$) at a pore diameter of 60 Å be less than or equal to 0.3 $cm^3/g·Å$. The log differential pore volume distribution is a pore distribution curve when the horizontal axis is a pore diameter D and the vertical axis is a log differential pore volume represented by $dVp/d(\log D)$. Vp is the pore volume per unit mass. The log differential pore volume distribution is obtained from the data of the integrated pore volume distribution obtained above.

When $V_{20}$ and $V_{60}$ are within the above ranges, the number of the mesopores tends to increase together with the number of the micropores, and the number of the macropores tends to decrease. Therefore, excellent float characteristics are easily obtained with a large capacitance in a low-temperature environment. When $V_{20}$ and $V_{60}$ are within the above ranges, the log differential pore volume distribution (pore distribution curve) may have, in a pore diameter range of from 20 Å to 60 Å, inclusive, a region in which the log differential pore volume decreases as the pore diameter increases and the tangent line at any point on the curve in the above range has a certain degree of inclination. As in the log differential pore volume distribution of x1 shown in FIG. 2, the tangent line preferably has a certain degree of inclination at a side where the pore diameter is close to 60 Å within the above range. When the above region is shifted to a side where the pore diameter is larger than 60 Å, the number of the macropores increases, so that the electrode density may decrease. When the region is shifted to a side where the pore diameter is smaller than a pore diameter of more than or equal to 20 Å, the number of the mesopores decreases, so that the float characteristics may be deteriorated.

$V_{20}$ may range from 0.5 $cm^3/g·Å$ to 2.0 $cm^3/g·Å$, inclusive, or from 1.0 $cm^3/g·Å$ to 1.5 $cm^3/g·Å$, inclusive. $V_{60}$ may range from 0.05 $cm^3/g·Å$ to 0.3 $cm^3/g·Å$, inclusive, or may be less than or equal to 0.2 $cm^3/g·Å$.

A difference $V_{20}-V_{60}$ between $V_{20}$ and $V_{60}$ is preferably more than or equal to 0.5 $cm^3/g·Å$. In this case, the absolute value of inclination of the tangent line is large, the proportion of the macropores tends to be small, so that the electrode density tends to be large. As in the log differential pore volume distribution of x1 shown in FIG. 2, the absolute value of inclination of the tangent line is preferably large on a side where the pore diameter is close to 60 Å within the above range. In this case, the number of the mesopores is larger, the number of the macropores is smaller, a large capacitance is obtained in a low-temperature environment, and the float characteristics are further improved. The difference $V_{20}-V_{60}$ may range from 0.5 $cm^3/g·Å$ to 1.5 $cm^3/g·Å$, inclusive, or from 0.8 $cm^3/g·Å$ to 1.0 $cm^3/g·Å$, inclusive.

The log differential pore volume distribution may have one peak (maximum value of the log differential pore volume) in a pore diameter ranging from 10 Å to 20 Å, inclusive. Having such a log differential pore volume distribution facilitates control of $V_{20}$, $V_{60}$, and the difference $V_{20}-V_{60}$ within the above ranges, and secure of many mesopores and micropores.

The porous carbon particles can be produced, for example, by subjecting a raw material to a heat treatment to carbonize the raw material, and subjecting the obtained carbide to an activation treatment to obtain the porous particles. Examples of the raw material include wood, coconut shell, pulp waste liquid, coal or coal-based pitch obtained through thermal decomposition of coal, heavy oil or petroleum-based pitch obtained through thermal decomposition of heavy oil, phenol resin, petroleum coke, and coal coke. Examples of the activation treatment include gas activation using a gas such as water vapor, and chemical activation using an alkali such as potassium hydroxide. The porous carbon particles obtained by the activation treatment may be subjected to a pulverization treatment. After the pulverization treatment, a classification treatment may be performed. For the pulverization treatment, for example, a ball mill or a jet mill is used.

The porous carbon particles are obtained by, for example, subjecting a coconut shell to a heat treatment, pulverizing and sizing the obtained carbide, and subjecting the carbide to an activation treatment. In addition, the porous carbon particles are obtained, for example, by adding a binder such as coal tar or pitch to finely pulverized coal, kneading the mixture, compression molding the mixture, pulverizing and sizing the molded product, and then subjecting the pulverized product to a heat treatment and an activation treatment.

The pore distribution of the porous carbon particles can be adjusted by, for example, the raw material, the heat treatment temperature, the activation temperature in gas activation, and the degree of pulverization. The porous carbon particles may be used alone or in combination of more than or equal to two types thereof.

At least one of the pair of electrodes may include an active layer, and a current collector that supports the active layer. The active layer contains at least the porous carbon particles as an active material. The active layer may contain a blended material (mixture) of porous carbon particles and a small amount of a binding agent and/or a conductive agent. The proportion of the porous carbon particles in the active layer (mixture) is, for example, more than or equal to 88 mass %.

As the binding agent, for example, a resin material such as polytetrafluoroethylene (PTFE), carboxymethyl cellulose (CMC) (an alkali metal salt or an ammonium salt of CMC), and styrene-butadiene rubber (SBR) are used. As the conductive agent, for example, carbon black such as acetylene black is used.

The electrode is obtained, for example, by applying a slurry containing porous carbon particles, a binding agent, and/or a conductive agent, and a dispersion medium to a surface of a current collector, drying the coating film, followed by rolling, to thereby form an active layer. As the current collector, for example, a metal foil such as an aluminum foil is used.

Examples of the electrochemical device include an electric double layer capacitor (EDLC) and a lithium ion capacitor (LIC). When the electrochemical device is EDLC, an electrode containing the porous carbon particles can be used as at least one of the pair of electrodes. When the electrochemical device is LIC, an electrode containing the porous carbon particles can be used for one (positive electrode) of the pair of electrodes, and a negative electrode used in a lithium ion secondary battery can be used for the other (negative electrode) of the pair of electrodes. The negative electrode used in a lithium ion secondary battery contains, for example, a negative electrode active material (for example, graphite) capable of absorbing and releasing lithium ions.

The electrolytic solution contains a solvent (non-aqueous solvent) and an ionic substance. The ionic substance is dissolved in the solvent and contains a cation and an anion. The ionic substance may contain, for example, a low melting point compound (ionic liquid) that can exist as a liquid at around normal temperature. The concentration of the ionic substance in the electrolytic solution is, for example, more than or equal to 0.5 mol/L and less than or equal to 2.0 mol/L.

The solvent is preferably a high boiling point solvent. Examples of the solvent that can be used include lactones such as γ-butyrolactone, carbonates such as propylene carbonate, polyhydric alcohols such as ethylene glycol and propylene glycol, cyclic sulfones such as sulfolane, amides such as N-methylacetamide, N,N-dimethylformamide, and N-methyl-2-pyrrolidone, esters such as methyl acetate, ethers such as 1,4-dioxane, ketones such as methyl ethyl ketone, and formaldehyde.

The ionic substance contains, for example, an organic salt. The organic salt is a salt in which at least one of an anion and a cation contains an organic substance. Examples of the organic salt in which a cation contains an organic substance include quaternary ammonium salts. Examples of the organic salt in which an anion (or both ions) contain(s) an organic substance include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

From the viewpoint of improving the withstand voltage characteristics, the anion preferably includes a fluorine-containing acid anion. Examples of the fluorine-containing acid anion include $BF_4^-$ and/or $PF_6^-$. The organic salt preferably contains, for example, a tetraalkylammonium cation and a fluorine-containing acid anion. Specific examples thereof include diethyldimethylammonium tetrafluoroborate ($DEDMABF_4$) and triethylmethylammonium tetrafluoroborate ($TEMABF_4$).

It is desirable to interpose a separator between the pair of electrodes. The separator has ion permeability and has a role of physically separating the pair of electrodes to prevent a short circuit. As the separator, for example, a nonwoven fabric containing cellulose as a main component, a glass fiber mat, or a microporous film made of polyolefin such as polyethylene is used.

Hereinafter, an electrochemical device according to an exemplary embodiment of the present invention will be described with reference to FIG. 1. FIG. 1 is a partially cutout perspective view illustrating an electrochemical device according to an exemplary embodiment of the present invention. The present invention is not limited to the electrochemical device of FIG. 1.

Electrochemical device 10 in FIG. 1 is an electric double layer capacitor, and includes capacitor element 1 which is a wound capacitor element. Capacitor element 1 has a structure in which sheet-like first electrode 2 and sheet-like second electrode 3 are wound with separator 4 interposed therebetween. First electrode 2 and second electrode 3 have a first current collector and a second current collector made of metal, respectively, and a first active layer and a second active layer supported on surfaces of the first current collector and the second current collector, respectively, and exhibit capacitance by adsorbing and desorbing ions.

For example, an aluminum foil is used as the current collector. The surface of the current collector may be roughened by a method such as etching. As separator 4, for example, a nonwoven fabric containing cellulose as a main component is used. First lead wire 5a and second lead wire 5b are connected as lead-out members to first electrode 2 and second electrode 3, respectively. Capacitor element 1 is housed in cylindrical outer case 6 together with an electrolytic solution (not shown). The material of outer case 6 may be, for example, metal such as aluminum, stainless steel, copper, iron, or brass. The opening of outer case 6 is sealed with sealing member 7. Lead wires 5a and 5b are led out to the outside to penetrate sealing member 7. For sealing member 7, for example, a rubber material such as butyl rubber is used.

In the above exemplary embodiment, the wound capacitor has been described, but the application range of the present invention is not limited to the above, and the present invention can also be applied to a capacitor having another structure, for example, a stacked capacitor or a coin capacitor.

Hereinafter, the present invention will be described in more detail based on examples, but the present invention is not limited to the examples.

Examples 1 to 2 and Comparative Examples 1 to 2

A wound electric double layer capacitor having a rated voltage of 2.7 V was produced as an electrochemical device. Hereinafter, a specific method for producing the electrochemical device will be described.

(Production of Electrode)

First, 88 parts by mass of an active material, 2 parts by mass of polytetrafluoroethylene, 4 parts by mass of an ammonium salt of carboxymethyl cellulose swollen in water (solid content: 5 mass %), and 6 parts by mass of acetylene black were dispersed in water to prepare a slurry. The obtained slurry was applied to an aluminum (Al) foil (thickness: 30 μm), and the coating film was vacuum-dried at 110° C. and rolled to form an active layer (thickness: 40 μm), thereby obtaining an electrode.

(Preparation of Electrolytic Solution)

Diethyldimethylammonium tetrafluoroborate (DEDMABF$_4$) was dissolved in γ-butyrolactone (GBL) to prepare an electrolytic solution. The concentration of DEDMABF$_4$ in the electrolytic solution was 1.0 mol/L.

(Production of Electrochemical Device)

A pair of electrodes were prepared, lead wires were connected to respective electrodes, and the electrodes were wound with a separator made of a cellulose nonwoven fabric interposed therebetween to form a capacitor element. The capacitor element was housed in a predetermined outer case together with an electrolytic solution, and the case was sealed with a sealing member to complete an electrochemical device (electric double layer capacitor). Thereafter, an aging treatment was performed at 60° C. for 16 hours while a rated voltage was applied to the electrochemical device A1.

In the production of the electrode, electrodes x1 to x2 and y1 to y2 were obtained using porous carbon particles having different pore distributions as active materials. Electrochemical devices were produced using the electrodes. The electrochemical devices of Examples 1 to 2 are electrochemical devices X1 to X2 including a pair of electrodes x1 to x2. The electrochemical devices of Comparative Examples 1 to 2 are electrochemical devices Y1 to Y2 including a pair of electrodes y1 to y2.

Figure 2:
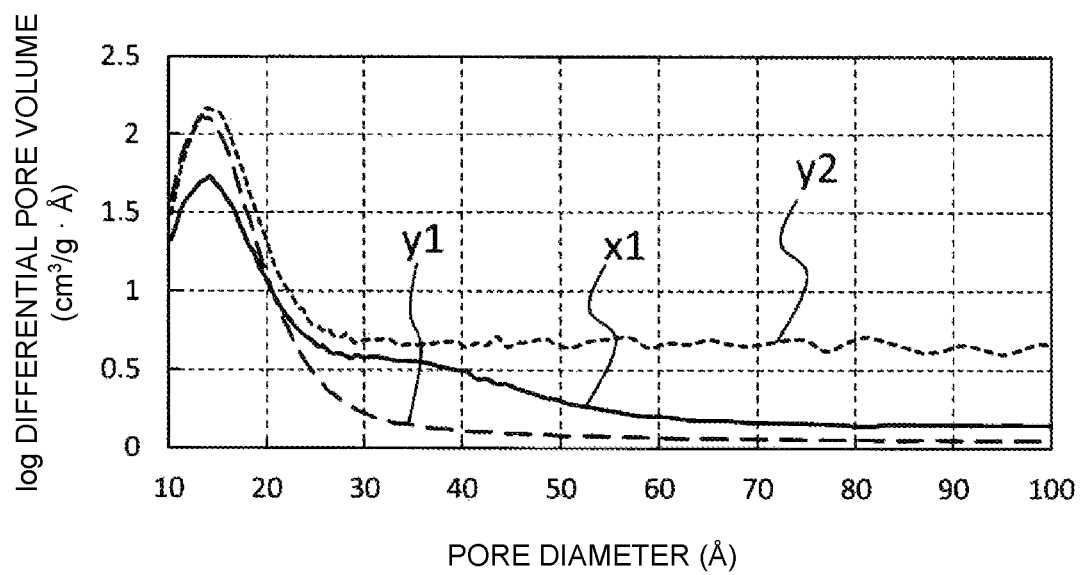
FIG. 2 is a graph showing the pore distributions of porous carbon particles contained in electrodes included in electrochemical devices of Example 1 and Comparative Examples 1 to 2 of the present invention.

Each electrochemical device (completely discharged after aging treatment) was disassembled, and the pore distribution of the porous carbon particles contained in the active layer of each electrode was measured according to the method described above. Table 1 shows data on the pore distribution of the porous carbon particles contained in the electrode included in each electrochemical device. In addition, as an example, the pore distributions of porous carbon particles contained in the electrodes included in the electrochemical devices of Example 1 and Comparative Examples 1 to 2 are shown in FIG. 2. In FIG. 2, x1 and y1 to y2 represent the log differential pore volume distributions of the porous carbon particles contained in the electrodes x1 and y1 to y2 of the electrochemical devices X1 and Y1 to Y2, respectively.

In the porous carbon particles included in the electrodes x1 and x2, the proportion of total of the integrated volumes A and B in the total pore volume (total of volumes of all pores in a range of from 10 Å to 3,000 Å, inclusive) was in a range of from 60% to 85%, inclusive. In addition, the log differential pore volume distribution had one peak (maximum value of the log differential pore volume) in a pore diameter ranging from 10 Å to 20 Å, inclusive. In the porous carbon particles contained in the electrode x1, $V_{20}$ was 1.1 cm$^3$/g·Å, $V_{60}$ was 0.2 cm$^3$/g·Å, and the difference $V_{20}$–$V_{60}$ was 0.9 cm$^3$/g·Å. In the porous carbon particles contained in the electrode x2, $V_{20}$ was 0.8 cm$^3$/g·Å, $V_{60}$ was 0.3 cm$^3$/g·Å, and the difference $V_{20}$–$V_{60}$ was 0.5 cm$^3$/g·Å.

Each electrochemical device obtained as described above was evaluated as follows.

[Evaluation]

(Measurement of Capacitance and Internal Resistance of Electrochemical Device at Initial Stage (Before Float Test))

Under an environment of –30° C., constant current charge was performed at a current of 100 mA until the voltage reached 2.7 V, and then a state in which a voltage of 2.7 V was applied was maintained for 7 minutes. Thereafter, constant current discharge was performed at a current of 75 mA under an environment of –30° C. until the voltage reached 0 V.

A time t (sec) required for the voltage to drop from 2.0 V to 1.5 V in the discharge was measured. Note that 2.0 V is a voltage corresponding to 74% of 2.7 V (voltage at full charge), and 1.5 V is a voltage corresponding to 56% of 2.7 V. Using measured time t, a capacitance (initial capacitance) C1 (F) of the electrochemical device before the float test was determined from Formula (1) below.

$$\text{Capacitance } C1 = Id \times t / V \quad (1)$$

In Formula (1), Id is a current value (0.075 A) at the time of discharge, and V is a value (0.5 V) obtained by subtracting 1.5 V from 2.0 V.

Using a discharge curve (vertical axis: discharge voltage, horizontal axis: discharge time) obtained by the above discharge, a linear approximate line of the discharge curve in the range of 0.5 seconds to 2 seconds after the start of discharge was obtained, and a voltage VS of the intercept of the linear approximate line was determined. A value (V0–VS) obtained by subtracting the voltage VS from a voltage V0 at the start of discharge (when 0 second has elapsed from the start of discharge) was obtained as ΔV. Using ΔV (V) and the current value Id (0.075 A) at the time of discharge, an internal resistance (DCR) R1 (Ω) of the electrochemical device before the float test was determined from Formula (2) below.

$$\text{Internal resistance } R1 = \Delta V / Id \quad (2)$$

(Float Test of Electrochemical Device)

Under an environment of 70° C., constant current charge was performed at a current of 100 mA until the voltage reached 2.7 V, and then a voltage of 2.7 V was held for 1,300 hours. In this way, the electrochemical device was stored in a state where a voltage of 2.7 V was applied thereto. Thereafter, constant current discharge was performed at a current of 20 mA under an environment of 25° C. until the voltage reached 0 V.

(Measurement of Internal Resistance of Electrochemical Device after Float Test)

Thereafter, the electrochemical device was charged and discharged under an environment of –30° C. in the same manner as in the measurement of the internal resistance before the float test, and the internal resistance R2 (Ω) after the float test was determined.

(Measurement of Resistance Change Rate)

Using the internal resistance R1 and the internal resistance R2 before and after the float test of the electrochemical device obtained as described above, the resistance change rate was determined from Formula (3) below.

$$\text{Resistance change rate} = R2/R1 \times 100 \quad (3)$$

The evaluation results of the electrochemical devices X1 to X2 and Y1 to Y2 are shown in Table 1. In Table 1, the electrode density is a mass (g) of the porous carbon particles contained per 1 cm$^3$ of the active layer.

TABLE 1

| Electrochemical device | Electrode | Pore distribution of porous carbon particles | | | |
|---|---|---|---|---|---|
| | | Integrated volume A of pores having pore diameter of more than or equal to 10 Å and less than 20 Å (cm³/g) | Integrated volume B of pores having pore diameter of from 20 Å to 60 Å inclusive (cm³/g) | Integrated volume C of pores having pore diameter of more than 60 Å and less than or equal to 500 Å (cm³/g) | B/A |
| X1 | x1 | 0.44 | 0.26 | 0.15 | 0.6 |
| X2 | x2 | 0.36 | 0.15 | 0.25 | 0.5 |
| Y1 | y1 | 0.49 | 0.14 | 0.05 | 0.3 |
| Y2 | y2 | 0.54 | 0.36 | 0.44 | 0.67 |

| Electrochemical device | Electrode density (g/cm³) | Evaluation | |
|---|---|---|---|
| | | Initial capacitance at low temperature (F.) | Resistance change rate at low temperature (%) |
| X1 | 0.52 | 5.8 | 199 |
| X2 | 0.44 | 5.3 | 189 |
| Y1 | 0.55 | 6.0 | 330 |
| Y2 | 0.37 | 4.4 | 258 |

In the electrochemical devices X1 and X2, the initial capacitance was large, the resistance change rate was small, and excellent float characteristics were obtained.

In the electrochemical device Y1, the integrated volume B was smaller than 0.15 cm³/g, the resistance change rate increased, and the float characteristics deteriorated. In the electrochemical device Y2, the integrated volume C was larger than 0.25 cm³/g, and the initial capacitance decreased.

The electrochemical device according to the present invention is suitably used for applications requiring a large capacitance and excellent float characteristics.

The invention claimed is:

1. An electrochemical device comprising:
a pair of electrodes; and
an electrolytic solution, wherein:
at least one of the pair of electrodes contains porous carbon particles,
in a pore distribution of the porous carbon particles, an integrated volume B is more than or equal to 0.15 cm³/g and less than or equal to 0.35 cm³/g and an integrated volume C is less than or equal to 0.25 cm³/g, the integrated volume B being an integrated volume of pores each having a pore diameter of more than or equal to 20 Å and less than or equal to 60 Å, the integrated volume C being an integrated volume of pores each having a pore diameter of more than 60 Å and less than or equal to 500 Å, and
in a log differential pore volume distribution of the porous carbon particles, a log differential pore volume $V_{20}$ at a pore diameter of 20 Å is more than or equal to 0.5 cm³/g·Å and a log differential pore volume $V_{60}$ at a pore diameter of 60 Å is less than or equal to 0.3 cm³/g·Å.

2. The electrochemical device according to claim 1, wherein the integrated volume C is less than or equal to 0.15 cm³/g.

3. The electrochemical device according to claim 1, wherein a ratio B/A of the integrated volume B to an integrated volume A is more than or equal to 0.5, the integrated volume A being an integrated volume of pores each having a pore diameter of more than or equal to 10 Å and less than 20 Å in the pore distribution of the porous carbon particles.

4. The electrochemical device according to claim 3, wherein the ratio B/A of the integrated volume B to the integrated volume A is from 0.5 to 0.65, inclusive.

5. The electrochemical device according to claim 3, wherein the ratio B/A of the integrated volume B to the integrated volume A is from 0.5 to 0.6, inclusive.

6. The electrochemical device according to claim 1, wherein a difference $V_{20}-V_{60}$ is more than or equal to 0.5 cm³/g·Å, the difference $V_{20}-V_{60}$ being a difference between the log differential pore volume $V_{20}$ and the log differential pore volume $V_{60}$.

7. The electrochemical device according to claim 1, wherein the integrated volume B is more than or equal to 0.25 cm³/g and less than or equal to 0.30 cm³/g.

8. The electrochemical device according to claim 1, wherein the integrated volume B is more than or equal to 0.15 cm³/g and less than or equal to 0.26 cm³/g.

* * * * *